No. 629,840. Patented Aug. 1, 1899.
A. WUNDES.
EXHIBITION CASE FOR EXPOSING POCKET KNIVES, &c.
(Application filed Mar. 16, 1899.)
(No Model.)
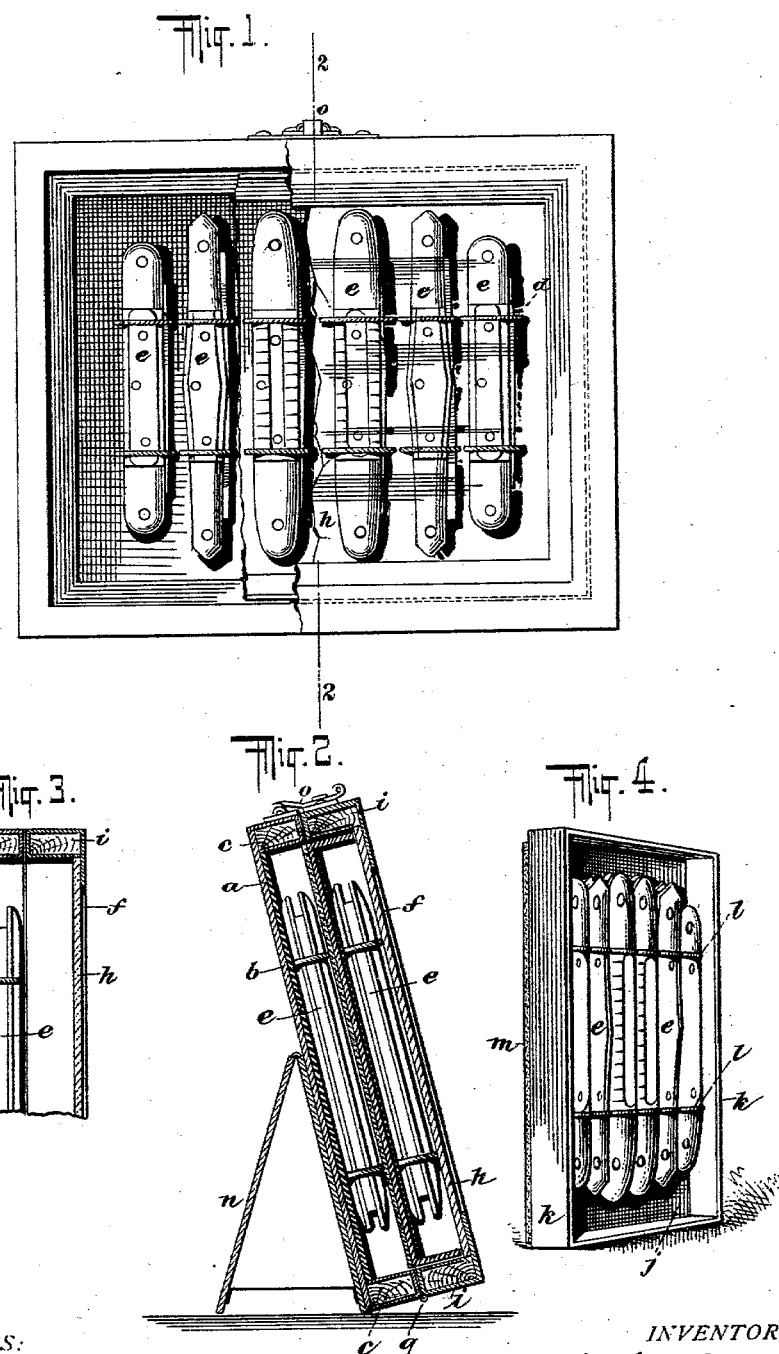
WITNESSES:
INVENTOR.
Abraham Wundes.
BY
ATTORNEYS

UNITED STATES PATENT OFFICE.

ABRAHAM WUNDES, OF SOLINGEN, GERMANY, ASSIGNOR TO THE GEO. BORGFELDT & COMPANY, OF NEW YORK, N. Y.

EXHIBITION-CASE FOR EXPOSING POCKET-KNIVES, &c.

SPECIFICATION forming part of Letters Patent No. 629,840, dated August 1, 1899.

Application filed March 16, 1899. Serial No. 709,299. (No model.)

*To all whom it may concern:*

Be it known that I, ABRAHAM WUNDES, a subject of the Emperor of Germany, residing at Solingen, Germany, have invented certain new and useful Improvements in Exhibition-Cases for Exposing Pocket-Knives and other Small Articles, of which the following is a specification.

My invention relates to exhibition-cases for exposing pocket-knives and other small articles for sale.

When used for knives, my structure has many advantages over existing devices for exposing knives for sale, chief among which is that I am enabled to expose the knives for sale in an attractive and convenient manner without danger of the knives becoming rusty or shop-worn.

My invention will be described with reference to the accompanying drawings, forming part hereof, which shows one form in which my invention may be clothed, and in which like letters of reference designate like parts in all the views.

In the drawings, Figure 1 is a broken-away plan view of the exhibition-case. Fig. 2 is a central vertical section of the case on line 2 2 of Fig. 1 and shows the case set up on edge as it normally would be placed on a counter or show-case. Fig. 3 is a fragmentary vertical sectional view showing the removable tray removed, and Fig. 4 is an isometric view of the removable tray.

In the drawings, $a$ indicates the base of the case, having a bottom $b$ and side walls $c$. The bottom $b$ is provided with knife-holding loops $d$, (preferably of elastic cord or rubber,) beneath which the knives $e$ are secured. In case elastics are employed the knives may be readily removed from the device for inspection or sale. A cover $f$ is hinged to the base $a$ at $g$ and is provided with a transparent pane or window $h$ and side walls $i$. A removable tray $j$, having raised edges $k$ and knife-holding loops $l$, (preferably of rubber,) is provided, which tray fits accurately within the base and cover and has its raised edges about flush with the inner face of the cover and is preferably backed by a sheet of felt or other soft material $m$. The base $a$ is provided with a leg or foot $n$ to hold the device upright, as shown in Fig. 2, and the base and cover are secured together at some convenient place by a swinging catch $o$, which coacts with the hinge or hinges $g$ to hold the device closed. The whole is gotten up in a very attractive form, being usually covered with paper of a pretty pattern or design, so as to arrest the attention of observers.

It will be seen that I have devised an extremely simple, compact, and useful exhibition-case in which the knives may be exposed for sale without danger of rusting.

It is intended that the knives contained in the removable tray shall be sold first. For this purpose the removable tray is placed loosely in the case, so that the knives contained therein may be exposed through the glass of the cover. When the knives in the removable tray have been sold, the said removable tray is removed and the knives contained in the base of the case exposed to view, as will clearly appear from an inspection of Fig. 3.

For the purposes of shipping it is usual to reverse the removable tray, so that the knives contained in the tray and in the base will be brought face to face and the soft backing-piece $m$ of the removable tray brought beneath the glass.

Having described my invention, what I claim, and desire to secure by Letters Patent, is—

In a case for exposing knives and other small articles for sale, the combination of a base having walls $c\ c$, a series of knife-holding loops secured to the inside of the base, a cover having a window and side walls $i\ i$, the side walls of said base and cover being hinged together and a removable tray fitting within the cover and provided with a series of knife-holding loops and covering the knives in the base, whereby the cover will protect the knives in the tray, and the tray will protect and conceal the knives in the base, so that when the knives in the tray are sold, the said tray may be removed and the knives in the base exposed for sale.

ABRAHAM WUNDES.

Witnesses:
O. H. DÜLTGEN,
ERNST KATZ.